Figure 1:
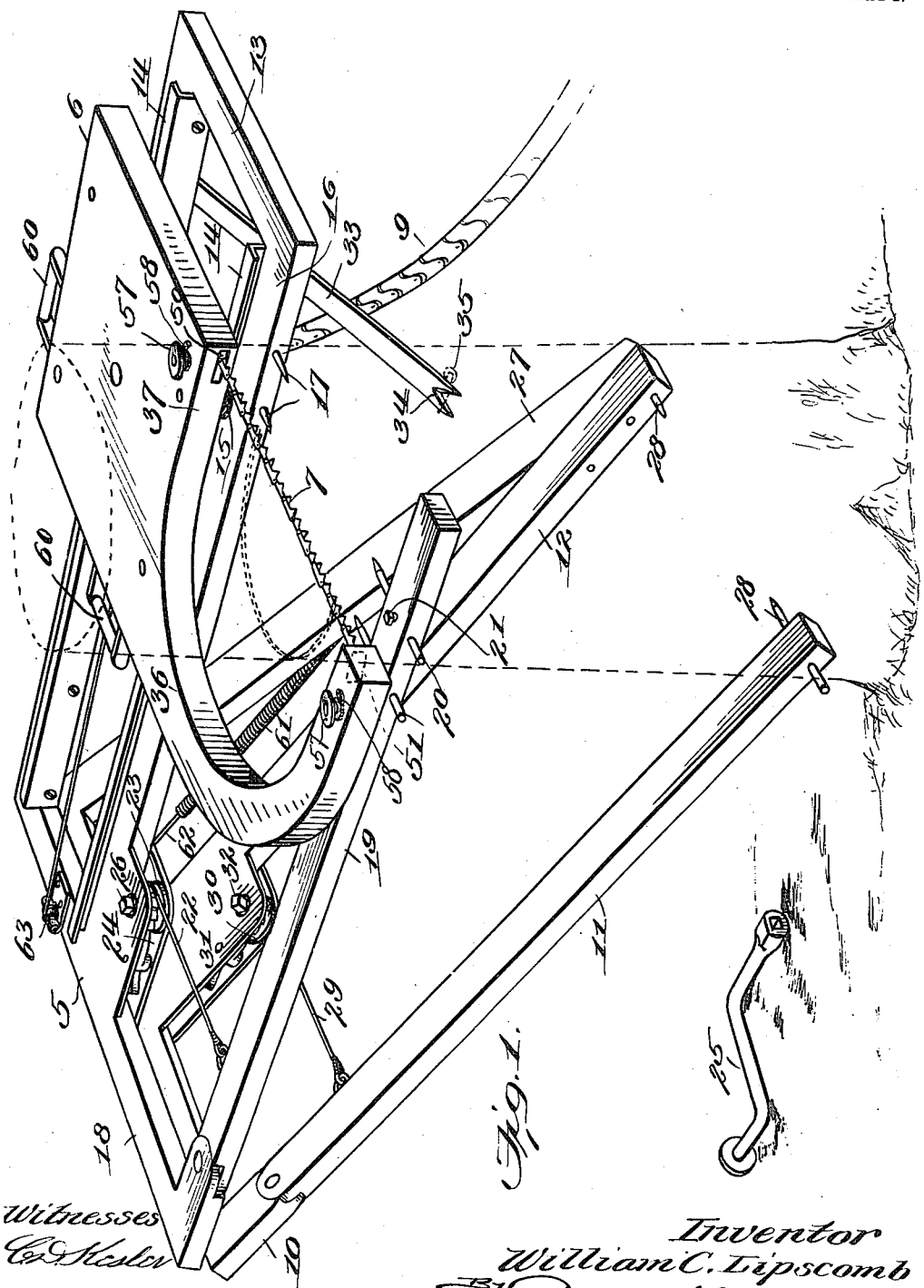

W. C. LIPSCOMB.
PORTABLE POWER CUT-OFF SAW.
APPLICATION FILED OCT. 14, 1910.

1,002,164.

Patented Aug. 29, 1911.

3 SHEETS—SHEET 1.

Witnesses

Inventor
William C. Lipscomb

W. C. LIPSCOMB.
PORTABLE POWER CUT-OFF SAW.
APPLICATION FILED OCT. 14, 1910.
1,002,164.
Patented Aug. 29, 1911.
3 SHEETS—SHEET 2.
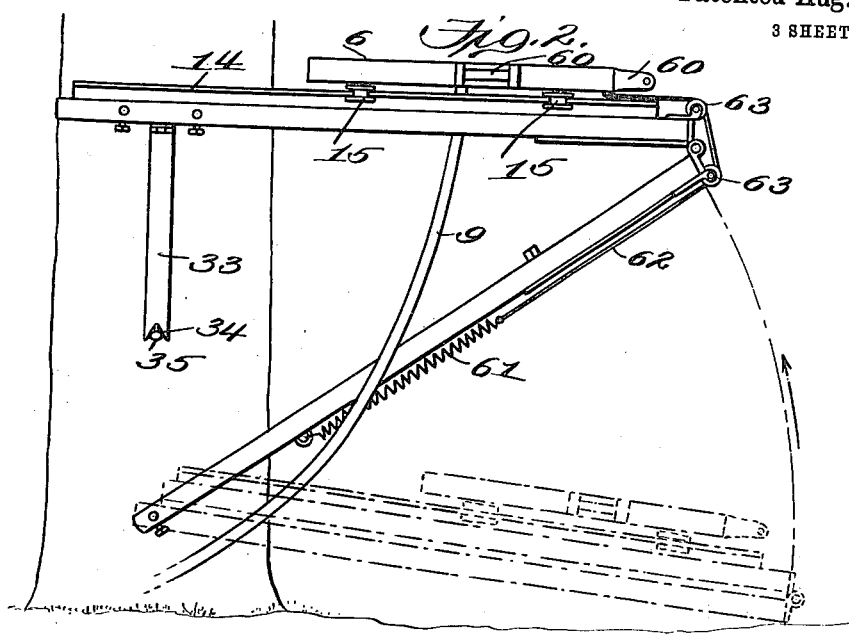
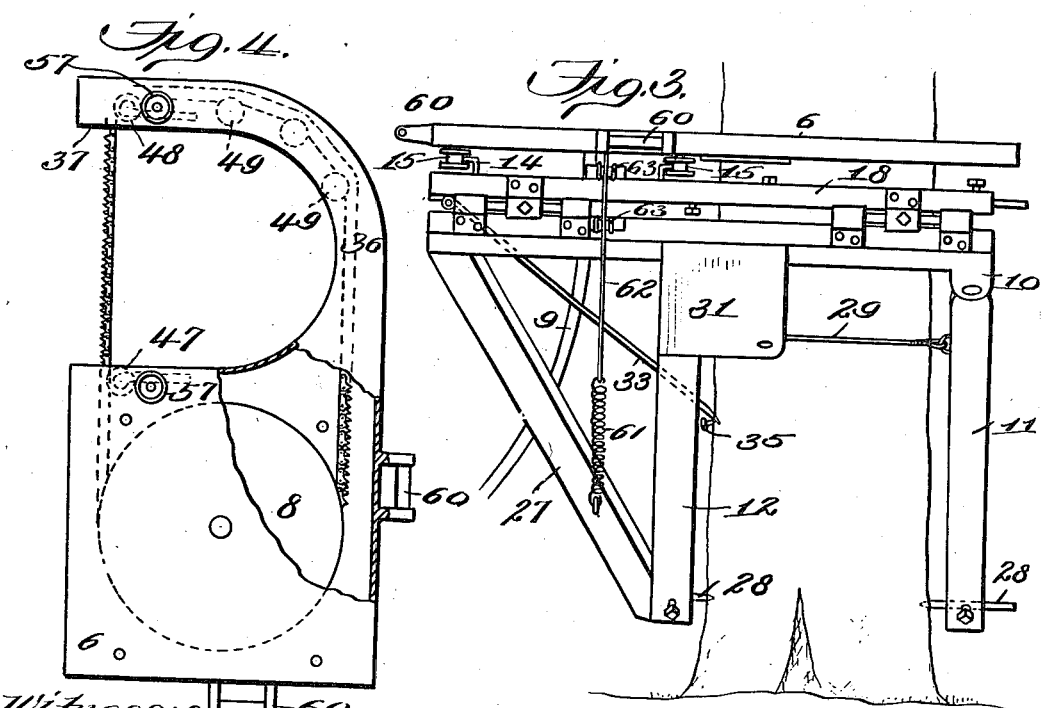

W. C. LIPSCOMB.
PORTABLE POWER CUT-OFF SAW.
APPLICATION FILED OCT. 14, 1910.
1,002,164.
Patented Aug. 29, 1911.
3 SHEETS—SHEET 3.
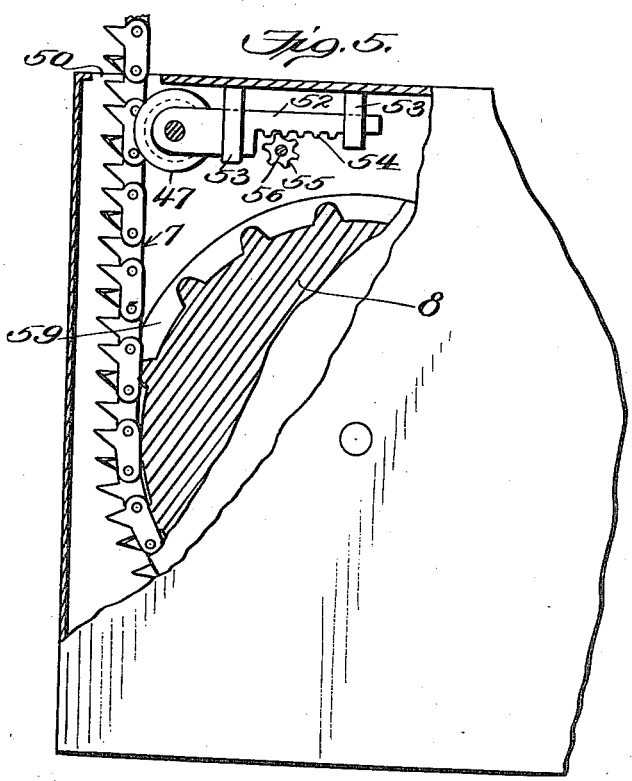
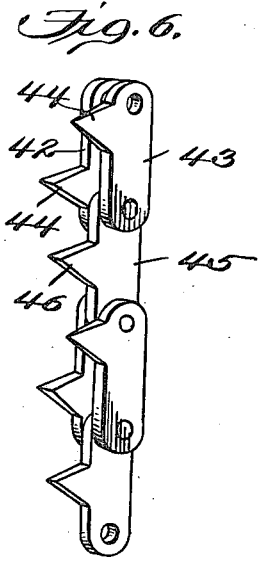
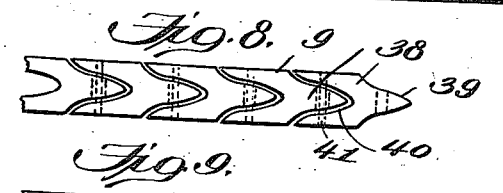
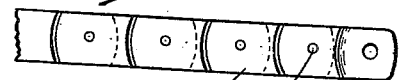
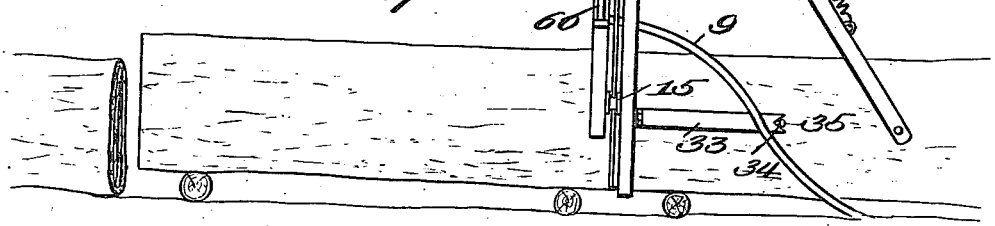
Witnesses:
Inventor
William C. Lipscomb

UNITED STATES PATENT OFFICE.

WILLIAM C. LIPSCOMB, OF CROCKETT, TEXAS.

PORTABLE POWER CUT-OFF SAW.

1,002,164. Specification of Letters Patent. Patented Aug. 29, 1911.

Application filed October 14, 1910. Serial No. 587,133.

*To all whom it may concern:*

Be it known that I, WILLIAM C. LIPSCOMB, a citizen of the United States, residing at Crockett, in the county of Houston and State of Texas, have invented new and useful Improvements in Portable Power Cut-Off Saws, of which the following is a specification.

This invention relates to portable power cut-off saws adapted for cutting off standing trees as well as severing logs disposed at any angle into suitable lengths.

The primary object of the invention is to provide a comparatively simple and effective portable power cut-off saw which may be readily applied to a standing tree or to a log lying at any angle relatively to the ground surface or fully on the ground surface and having positive endless saw means for severing a tree or log and also partially collapsible to reduce the same as much as possible for the purposes of transportation.

A further object of the invention is to provide a portable power cut-off saw with positively acting means for holding the same in applied position and to prevent movement of the device after it is applied so that the operation of the saw may become effective relatively to the tree or log as a cutting means without liability of the parts slipping and thereby avoiding breakage of the saw and the operative parts.

With these and other objects and advantages in view, the invention consists in the construction and arrangement of the several parts which will be more fully hereinafter described and claimed in preferred form.

In the drawings: Figure 1 is a perspective view of a portable power cut-off saw embodying the features of the invention and shown applied in operative position to a portion of a standing tree. Fig. 2 is a side elevation of the cut-off saw shown applied in operative position and collapsed in dotted lines to illustrate the mode of applying the saw. Fig. 3 is a front end elevation of the improved portable power cut-off saw shown applied. Fig. 4 is a top plan view of the saw carrier shown partially broken away and in section. Fig. 5 is a top plan view of a portion of the saw carrier on an enlarged scale and particularly showing the driving sprocket for the endless saw and also illustrating a saw tightening means, the carrier being broken away to show the interior thereof. Fig. 6 is a detail perspective view of a portion of the endless saw. Fig. 7 is a view in elevation showing the improved portable power cut-off saw applied to a log or felled tree for cutting the latter into suitable lengths. Figs. 8 and 9 are detail views of portions of a flexible power belt used in connection with the saw.

The improved portable power cut-off saw comprises essentially a bed 5, a saw carrier 6 shiftably mounted on the bed and provided with an endless saw 7 driven by a main sprocket 8 through the medium of a flexible power shaft 9, and a leg frame 10 hinged to the front end of the bed 5 and embodying legs 11 and 12 for embracing opposite side portions of a tree or log to support the machine in proper position relatively to the latter.

Incidentally the bed 5 comprises a track frame 13 at one side having thereon parallel flanged track rails 14 engaged by horizontally disposed grooved rollers 15 secured to the under side of the main body of the carrier 6. The track frame 13 includes in its organization an inner longitudinal beam or bar 16 provided with inwardly projecting spikes 17 adapted to be driven into the tree or log to be cut. The track frame 13 is fully open between the end and side portions thereof and the one end is continued entirely across the bed as at 18 and the opposite end terminates at the point of intersection with the beam or bar 16, thus forming an opening at one end of the bed to one side of the center and of suitable width to permit the said open portion of the bed to be applied over trees and logs having various diameters. From the extension 18 of the one end of the bed a securing beam or bar 19 extends longitudinally and is movably attached or hinged to the bed at one end and free at the opposite end or extremity. The free extremity of the securing beam or bar 19 is provided with spikes 20 which coöperate with the spikes 17 by engagement with the tree trunk or log to hold the bed firmly applied to the tree or log. The spikes 17 and 20 may all be made adjustable as to their inward projection, as for instance by means of set-screws, as indicated at 21, see Fig. 1. It is especially necessary, however, that the spikes 20 carried by the beam or bar 19 be adjustable in order to obtain an opening of the greatest maximum width for the purpose of embracing very large trees or logs. The beam or bar 19 with its spikes 20 is adjustable through the medium of a small draw cable or wire 22 secured to the inner side ends thereof adjacent to the rear hinged extremity and adapted to be wound upon a ratchet drum or reel 23 carried within a sheating or suitable casing 24 secured to the intersecting portions of the beam or bar 16 and the extension 18. The drum or reel 23 is operated by a crank 25, as shown in detail by Fig. 1, to one side of the machine, and said crank is adapted to be fitted over the projecting squared end 26 of the shaft of the drum or reel 23 to wind the cable or wire 22 and thereby draw the beam or bar 19 inwardly with sufficient tension to set up a positive penetration of the inner ends of the spikes 17 and 20 relatively to the tree trunk or log to be cut.

The leg 11 forming part of the leg frame 10 is also hinged to the latter frame in a manner similar to the hinging of the beam or bar 19 to the extension 18 so that said leg 11 may have a lateral movement imparted thereto. The leg 12 is fixed or rigid, and to strengthen the same a brace 27 is secured to the free extremity thereof and also to the hinged end of the leg frame 10, the leg 12 intersecting an intermediate portion of the said leg frame. In the free ends of the legs 11 and 12 are spikes 28, one in each, which are adapted to be driven into the lower portion of the tree trunk or into a log at a suitable distance from the point of application of the spikes 17 and 20. A small draw cable or wire 29 is also secured to the inner side of the leg 11 near the hinged extremity of the latter and engages a ratchet winding drum or reel 30 held at the intersection of the leg 12 and the end of the frame 10 within a casing or sheathing 31. The ratchet drum or reel 30 is operated by means of the crank or crank handle 25, and said drum or reel has the upper extremity of its shaft or axis squared and projected through the top of the casing or sheathing 31, as at 32. The purpose of the draw cable or wire 29 is to force the leg 11 inwardly and insure a positive engagement of the spikes 28 with opposite portions of the tree trunk or log, and in the application of the machine the legs 11 and 12 will first be preferably applied while the parts of the machine are collapsed, as shown by Fig. 2, and the bed afterward raised to a horizontal plane and secured through the medium of the spikes 20 and 17. The bed 5 is further supported by a prop or guard 33 hinged at its upper end to the outer side of the rail frame 13 and having a lower notched end as at 34 to fit over a spike or nail 35 driven into the tree or log. This prop or guard 33 obstructs any tendency to downward movement of the track frame 13, particularly when the saw carrier 6 is being shifted or is held up to the work by the operator with more or less pressure or feeding movement.

The carrier 6 consists of a hollow frame or inclosure having about one-half of the same formed as a yoke or goose-neck 36 so as to provide an open throat 37 across which the endless saw 7 has movement. The dimensions of the throat 37 as formed by the yoke or goose-neck 36 will be such as to accommodate trees and logs of very large diameter and the dimensions thereof may be varied at will. Within the carrier 6, as hereinbefore indicated, the drive sprocket 8 is mounted and is of rather large diameter. The flexible shaft 9 which is employed to operate the sprocket 8 may be of any suitable length and is connected up with either a gasolene or electric motor or with any other suitable power generating means situated at a distance from the tree or log to be cut. It is preferred that the said flexible shaft 9 be of the form shown in detail by Figs. 8 and 9 or composed of a plurality of interfitting sections 38 of similar construction or each reduced at one extremity as at 39 and provided with a socket 40 at the opposite extremity, a pin 41 connecting the reduced end 39 of one section to the socketed end 40 of the contiguous section, these pins being regularly inserted throughout the whole series of sections. The saw 7 is made up preferably of a plurality of links 42 and 43 arranged side by side and having teeth 44 at reverse extremities, the pairs of links 42 and 43 being connected by single or intermediate links 45 each having a centrally disposed tooth 46. By the arrangement of the teeth 44 and 46 on the several links as just specified, an endless saw is provided simulating in its structure a cross-cut saw or an endless saw having the teeth in staggered relation. Any form of endless saw, however, may be used in connection with the improved portable cut-off saw and likewise any form of flexible shaft may be employed. The saw 7 is not only trained over the drive sprocket 8, but also over direction pulleys 47, 48 and 49, the pulleys 48 and 49 being disposed in the outer extremity or arm of the yoke or goose-neck 36, as clearly shown by Fig. 4. The pulleys 47 and 48 are located adjacent to the openings 50 and 51 through which the saw passes across the throat 37, and said pulleys 47 and 48 are each carried by a slide 52 movable in suitable guides 53 and formed with a rack-bar 54 engaged by a pinion 55, the stem 56 of the pinion projecting upwardly through the top of the carrier adjacent to the opening 50 and also near the opening 51 in the extremity of the outer arm of the yoke or goose-neck 36 and provided with a turning head 57 and a ratchet and pawl 58. By operating the turning head 57 and rotating the pinion 55, the slide 52 carrying either the direction pulley 47 or pulley 48 may be moved outwardly or inwardly to tighten or slacken the endless saw, as may be desired. To insure a reliable operation of the endless saw 7, the drive sprocket 8 is grooved as at 59 and the direction pulleys 47, 48 and 49 are likewise grooved so that it will be impossible for the saw to become disengaged from the operative parts. To facilitate movement of the carrier 6 and parts mounted therein including the saw 7, hand-grips 60 are applied to the rear and outer side edges thereof, as clearly shown by Fig. 1, so that the operator may stand in convenient position relatively to the machine and move or feed the carrier with the saw 7 up to and properly through the tree or log. The movement of the carrier toward the tree or log to be cut is in opposition to the tension of a spring 61 secured at one end to the under intermediate portion of the brace 27 and having a cable or wire 62 attached to its opposite end and trained upwardly over a direction pulley 63 on the rear end of the bed 5 and attached to the under portion of the carrier. In view of this spring 61 the carrier when released will be drawn rearwardly and retained in rearward position so that it will not interfere with the application of the machine to the trunk of a tree or to a log.

The hinges connecting the bed 5 and the leg frame 10, as clearly shown by Fig. 3, are composed of pairs of knuckle members 64 secured to the said leg frame near opposite extremities of the latter and a single knuckle member 65 secured to the adjacent edge of the bed. The knuckle members 64 are spaced a considerable distance and have the pintle 66 mounted therein and engaged between the said members 64 by the member 65, lateral play being given to the member 65 between the members 64 on the pintle, or in other words, the hinges are given a lateral sliding movement to accommodate the machine to bends, bulges, knots, etc., on the tree trunk. To obtain steadiness of these hinges when the machine is applied, the knuckle members 65 of the two sets of hinges are each provided with a set-screw 67 operative to bind against the pintle 66 and thereby hold the bed and leg frame in immovable relation. In setting up or collapsing the parts of the machine the set-screw 67 will be loosened.

From the foregoing the operation will be readily understood, and in preliminarily applying the cut-off saw or machine to a tree trunk or log in any position relatively to the ground surface, the legs 11 and 12 are first caused to embrace the tree trunk or log and the spikes 28 drawn into the latter by operating the draw cable or wire 29 through the medium of the ratchet drum or reel 30. After the spikes 28 are thus applied they serve as pivot or fulcrum means for the machine and particularly for the bed 5 which is elevated to a horizontal position and secured to the trunk of the tree by the spikes 17 and 20, or if a log is to be cut the bed 5 is moved relatively to the legs 11 and 12 until the saw 7 occupies a position in a plane at right angles to the log when brought up against the surface for cutting purposes. During this application of the machine either to a tree trunk or a log, the carrier 6 is held back or upwardly in accordance with the position of the bed 5 and the saw 7 will at the time be inoperative or without motion. The operator then moves the carrier 6 so as to bring the saw 7 into engagement with the tree trunk or log and the flexible shaft 9 is then caused to rotate by the motor to which it is attached and the saw 7 as a result travels at a high rate of speed and performs the desired cutting operation relatively to the tree trunk or log. The operator is protected against injury by the saw owing to the inclosure of the greater portion of the latter within the carrier 6 and particularly at the portions of the carrier having the grips 60 thereon. As soon as the tree trunk or log has been cut through, the carrier 6 is released from feeding pressure and the spring 61 comes into play and retracts the said carrier through the medium of the cable or wire 62. The machine may be readily detached from one tree and applied to another or from one portion of a log which has been cut through to another part of the log where it is desired to make a further cut. The machine is comparatively light and may be materially reduced for convenience in transporting the same from one point to another owing to the hinged attachment of the leg frame 10. The carrier 6 may also be freely moved without obstructing the operation of the shaft 9 owing to the flexibility of the latter and the open construction of the bed 5 through which the said shaft projects. The flexibility of the shaft 9 also permits the application of the machine to a log disposed at any angle relatively to the ground surface without interfering with the operation of the said shaft.

One of the important advantages of the present machine is that it may be arranged to have the saw cut in a horizontal plane or in a vertical plane or in other words to accommodate the position of the tree or log to be cut.

While the preferred form of the machine has been shown and described, it is obvious that many minor details of structure could be added and changes made in the proportions and dimensions of the several parts without departing from the spirit of the invention.

What is claimed is:

1. A portable power cut off saw comprising a portable bed with a leg frame hinged to one end thereof and provided with legs, one of the legs being hinged to the leg frame for lateral movement and both legs and portions of the bed having fastening means to removably engage a tree or log, the legs being united for simultaneous vertical swinging movement, a carrier shiftably mounted on the bed and having an endless saw therein, and means for driving the saw.

2. A portable power cut off saw comprising a bed with an opening therein to embrace a tree or log and having securing means to removably hold it in applied position to a tree or log, a manually operative carrier freely movable on the bed and provided with an endless saw and means for operating said saw, and a leg frame hinged to one end of the bed and having legs unitedly movable in a vertical plane and provided with fastening devices therein to engage a tree or log at a distance from the bed, one of the legs being laterally adjustable independently of the vertical movement thereof.

3. A portable power cut-off saw comprising a rigid bed with an opening in the front extremity to embrace a tree or log and having securing means to removably hold it in applied position to a tree or log, a carrier freely slidable on the bed and provided with an endless saw and means for operating said saw including a flexible shaft which is also movable with the carrier, the saw being shiftable by the carrier in rear of all of the front terminals of the parts of the frame to leave the opening in the latter clear to permit the entrance thereinto of the tree or log, the bed constituting a guide-way for the carrier throughout the movement of the latter, and collapsible means movably attached to one extremity of the bed for holding said bed in applied position.

4. A portable power cut-off saw comprising a rigid bed with an opening therein at one side of the longitudinal center of said bed to embrace a tree or log and having securing means movably attached to the extremity opposite that having the opening therein to hold the saw in removable position relatively to the tree or log, and a carrier freely slidable on the bed by a manual pushing operation and having a throat over the opening in the bed and an endless saw wholly carried thereby and shiftable therewith and movable across said throat over the bed opening and provided with means for operating the saw including a flexible shaft which is also movable with the carrier, the bed constituting a guide-way for the carrier throughout the movement of the latter, the saw being shiftable by the carrier fully in rear of all the front terminals of parts of the bed at the front extremity of the latter to leave the opening in the bed clear for the entrance thereinto of the tree or log.

5. In a machine of the class specified, a bed having members carrying fastening devices, legs hinged to one end of the bed and terminally carrying fastening devices, one of the members of the bed and one of the legs being movably connected, mechanism for drawing the movable member and movable leg inwardly toward the remaining member and leg to cause the fastening devices carried by the members and legs to positively engage a tree trunk or log, and a carrier shiftably mounted on the bed and having an endless saw movably mounted therein and partially exposed thereby.

6. In a machine of the class specified, a bed having members carrying fastening devices, legs hinged to one end of the bed and terminally carrying fastening devices, one of the members of the bed and one of the legs being movably connected, mechanism for drawing the movable member and movable leg inwardly toward the remaining member and leg to cause the fastening devices carried by the members and legs to positively engage a tree trunk or log, and cutting means movably mounted on the bed.

7. In a portable power cut off saw, a bed having hinged legs unitedly movable to and from the bed and provided with fastening means to engage a tree or log and serving as fulcrums relatively to the bed in positioning the latter on the tree or log, one of the legs being laterally movable independently of its movement to and from the bed, a carrier freely shiftable on the bed by a manual pushing operation and having an endless saw movably mounted therein and operatively exposed solely at one side of the longitudinal center thereof, and a flexible shaft engaging the carrier for driving the saw and freely movable with the said carrier.

8. In a portable power cut off saw, a bed having means for removably securing the same on a tree or log, a hollow carrier provided with a throat at one extremity formed by a hollow goose neck located at one side of the longitudinal center of the carrier, the carrier body being also hollow and all the sides and ends of the carrier being closed, the carrier being freely shiftable on the bed by a manual pushing operation exerted on the portion of the body from which the goose neck projects, a saw extending across the throat of the carrier and movable through the goose neck and hollow body thereof, the saw being operatively exposed solely across the throat of the carrier and movable over the different portions of the top of the bed with the carrier, and means for operating the saw.

9. In a portable power cut off saw, a bed provided with means for removably securing the same to a tree or log, and also having an opening at the front extremity thereof to receive a tree or log therein, a hollow carrier freely movable on the bed and operative by manually shoving the same over the bed, the said carrier having an endless saw movable therethrough and operating means for the saw therein, the carrier having a throat over the opening in the bed and across which the saw movably extends and all the walls of the carrier completely closed except where the saw passes outwardly from and into the same, the saw being movable backward and forward over the top of the bed and the opening in the latter, means on opposite sides of the throat for regulating the tension of the saw, means coöperating with the carrier for returning it to normal position when released, and means freely engaging and movable with the carrier for driving the saw.

In testimony whereof I have hereunto set my hand in presence of two subscribing witnesses.

WILLIAM C. LIPSCOMB.

Witnesses:
J. L. WORK,
J. D. SIMS, Jr.